(12) United States Patent
Epple

(10) Patent No.: US 9,994,202 B2
(45) Date of Patent: Jun. 12, 2018

(54) METHOD FOR OPERATING A BRAKE DEVICE, AND CONTROL UNIT

(71) Applicant: Robert Bosch GmbH, Stuttgart (DE)

(72) Inventor: Stefan Epple, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/329,719

(22) PCT Filed: Jun. 17, 2015

(86) PCT No.: PCT/EP2015/063515
§ 371 (c)(1),
(2) Date: Jan. 27, 2017

(87) PCT Pub. No.: WO2016/015916
PCT Pub. Date: Feb. 4, 2016

(65) Prior Publication Data
US 2017/0210366 A1    Jul. 27, 2017

(30) Foreign Application Priority Data
Jul. 29, 2014   (DE) .................. 10 2014 214 869

(51) Int. Cl.
| | |
|---|---|
| *B60T 8/44* | (2006.01) |
| *B60T 13/58* | (2006.01) |
| *B60T 13/52* | (2006.01) |
| *B60T 13/12* | (2006.01) |
| *B60T 13/72* | (2006.01) |

(52) U.S. Cl.
CPC .............. *B60T 8/441* (2013.01); *B60T 8/444* (2013.01); *B60T 13/12* (2013.01); *B60T 13/52* (2013.01); *B60T 13/581* (2013.01); *B60T 13/72* (2013.01)

(58) Field of Classification Search
CPC .......... B60T 8/441; B60T 8/444; B60T 13/12; B60T 13/52; B60T 13/581; B60T 13/72
USPC ............................................................ 303/4
See application file for complete search history.

(56) References Cited

U.S. PATENT DOCUMENTS 4,767,165 A * 8/1988 Burgdorf ............... B60T 8/441
303/114.3
6,161,903 A * 12/2000 Dieringer .............. B60T 8/3275
188/358

(Continued)

FOREIGN PATENT DOCUMENTS

DE         3605220 A1     8/1987
DE        19716404 C1    10/1998

(Continued)

OTHER PUBLICATIONS

International Search Report for PCT/EP2015/063515, dated Sep. 21, 2015.

*Primary Examiner* — Thomas W Irvin
(74) *Attorney, Agent, or Firm* — Norton Rose Fulbright US LLP; Gerard Messina

(57) ABSTRACT

A method is described for operating a hydraulic braking device of a vehicle, in particular a motor vehicle, including at least one brake booster, which sets a brake boost as a function of a driver's braking command. It is provided that the driver's braking command is ascertained via a vacuum sensor assigned to a pneumatic brake booster and a hydraulic brake boost is set.

6 Claims, 1 Drawing Sheet

(56) References Cited

U.S. PATENT DOCUMENTS

| | | | | |
|---|---|---|---|---|
| 6,672,687 | B2* | 1/2004 | Nishio | B60T 7/12 |
| | | | | 303/113.4 |
| 8,433,490 | B2* | 4/2013 | Kato | B60T 8/442 |
| | | | | 303/10 |
| 9,610,931 | B2* | 4/2017 | O'Meachair | B60T 8/172 |
| 2007/0024110 | A1* | 2/2007 | Isono | B60T 8/441 |
| | | | | 303/114.3 |
| 2010/0168978 | A1* | 7/2010 | Schubert | B60T 13/72 |
| | | | | 701/76 |
| 2013/0018559 | A1* | 1/2013 | Epple | B60T 8/3275 |
| | | | | 701/70 |
| 2014/0246897 | A1* | 9/2014 | Miyata | B60T 13/141 |
| | | | | 303/10 |
| 2017/0166179 | A1* | 6/2017 | Fujita | B60T 13/52 |

FOREIGN PATENT DOCUMENTS

| | | |
|---|---|---|
| DE | 102010002574 A1 | 9/2011 |
| DE | 102011080172 A1 | 2/2013 |

* cited by examiner

METHOD FOR OPERATING A BRAKE DEVICE, AND CONTROL UNIT

FIELD OF THE INVENTION

The present invention relates to a method for operating a braking device for a vehicle, in particular a motor vehicle, that includes at least one brake booster, an automatic brake boost being carried out as a function of a driver's braking command.

BACKGROUND INFORMATION

Methods of the type mentioned at the outset are known from the related art. For the operation of hydraulic braking devices, it is known, especially in the case of motor vehicles, to recognize an emergency situation as a function of a driver's braking command and to set a brake boost to assist the driver in the emergency situation. Thus, it is known, for example, from DE 10 2010 002 574 A1 to recognize an emergency braking situation as a function of the driver's braking command and a change of the rotational speed of at least one wheel of the vehicle. Modern braking devices operate hydraulically, the driver of the motor vehicle being able to set a desired braking pressure via brake pedal actuation. Typically, the hydraulic pressure set by the brake pedal actuation acts on a brake master cylinder, which presses brake fluid into a conduit system of the braking device, the thus-generated pressure being available to the wheel braking devices for the application of a braking torque. It is known to provide braking devices of this type with a pneumatic brake booster that makes available a higher braking pressure at the same operating force of the brake pedal. Typically, the braking force is boosted by a vacuum. The vacuum may be provided, for example, by the vacuum present in the intake manifold of an internal combustion engine of the motor vehicle or by a separate vacuum pump. A typical pneumatic brake booster includes a prechamber and a main chamber, the vacuum being applied to both. The two chambers are normally separated by a displaceable diaphragm. More or less atmospheric pressure comes into the prechamber by actuation of the brake pedal, thereby supporting the brake pedal actuation.

It is also known to provide a hydraulic brake booster that generates additional braking pressure and actively assists the conventional vacuum brake boost if the conventional vacuum-controlled brake booster is no longer sufficient to produce the needed or desired braking force or to reduce the structural volume of the pneumatic brake booster. Braking devices of this type are known in particular in connection with ESP systems (ESP=electronic stability program), which stabilize the driving state of a motor vehicle by individual wheel brake interventions.

According to the aforementioned document, the triggering instant for the hydraulic brake boost is hitherto selected as a function of the vehicle behavior, in particular as a function of the wheel speeds. As a result, the hydraulic brake boost usually occurs in a time-delayed manner.

SUMMARY

The method of the present invention has the advantage that an emergency situation is detected even faster than previously, thereby assisting the driver more quickly in his effort to decelerate the vehicle. This is achieved according to the present invention in that the driver's braking command is determined via a vacuum sensor assigned to a pneumatic brake booster and a hydraulic brake boost is set. The vacuum sensor makes it possible indirectly to infer the driver's command without provision of a pressure sensor as otherwise used in hydraulic operation. In particular, it is provided that a vacuum sensor already present in the system, which typically is used for engine control/regulation, is employed for the method according to the present invention, so that no additional costs for an additional sensor are incurred. If the driver's braking command is detected via the vacuum sensor, the hydraulic brake boost is able to be initiated even before the vehicle wheel speeds change. As a result, the driver receives especially quick assistance from the brake boost.

According to an advantageous further refinement of the present invention, it is provided that a pressure value detected by the vacuum sensor is compared to at least one specifiable first limiting value and that, if the first limiting value is exceeded by the pressure value, a first brake boost is set. The first brake boost is thus set only if the first specifiable limiting value has been exceeded. An inadvertent or premature triggering of the brake boost is thus prevented in a simple manner. The pressure value may be a pressure detected directly by the vacuum sensor or a quantity derived therefrom.

Furthermore, it is preferably provided that the pressure value detected by the vacuum sensor is compared to a second specifiable limiting value and that, in the event that the second limiting value is exceeded, a second brake boost is set, the second limiting value being higher than the first limiting value and the second brake boost being higher than the first brake boost. Therefore, when the pressure value detected by the vacuum sensor increases or when the pressure in the prechamber of the brake booster increases, the brake boost increases. Because this occurs as a function of the at least two limiting values, an incremental increase of the brake boost is provided in the present case.

Expediently, it is further preferably provided that the pressure value detected by the vacuum sensor is compared to a third specifiable limiting value, and, if the third limiting value is exceeded, a third brake boost is set, the third limiting value being higher than the second limiting value and the third brake boost being higher than the second brake boost. This essentially yields the aforementioned advantages. The provision of at least three limiting values makes it possible to increment the brake boost in a sufficiently satisfactory manner.

Furthermore, it is preferably provided that the brake boost is set as a function of the wear, service life and/or operating temperature of the braking device. If, for example, it is detected during operation of the braking device that signs of wear are present and as a result lower braking torques are produced while the control state remains unchanged, the brake boost is increased accordingly to compensate for the wear on the braking device. The brake boost is advantageously set as a function of wear, service life and/or operating temperature, regardless of which limiting value is being exceeded by the pressure currently detected by the vacuum sensor.

Furthermore, it is preferably provided that the brake boost is set as a function of a current road gradient. To accomplish this, the road gradient is continuously ascertained, for example, by an acceleration sensor and/or on the basis of data of a navigation system of the vehicle. If it is detected that the vehicle is moving up an incline, the brake boost is preferably reduced. If it is detected that the vehicle is moving down an incline, the brake boost is preferably increased. This results in the same vehicle braking behavior always being provided for the driver.

The control unit according to the present invention is distinguished by the fact that it carries out the method according to the present invention. The control unit is thus an especially preferably a component of the braking device.

DETAILED DESCRIPTION

Figure 1:
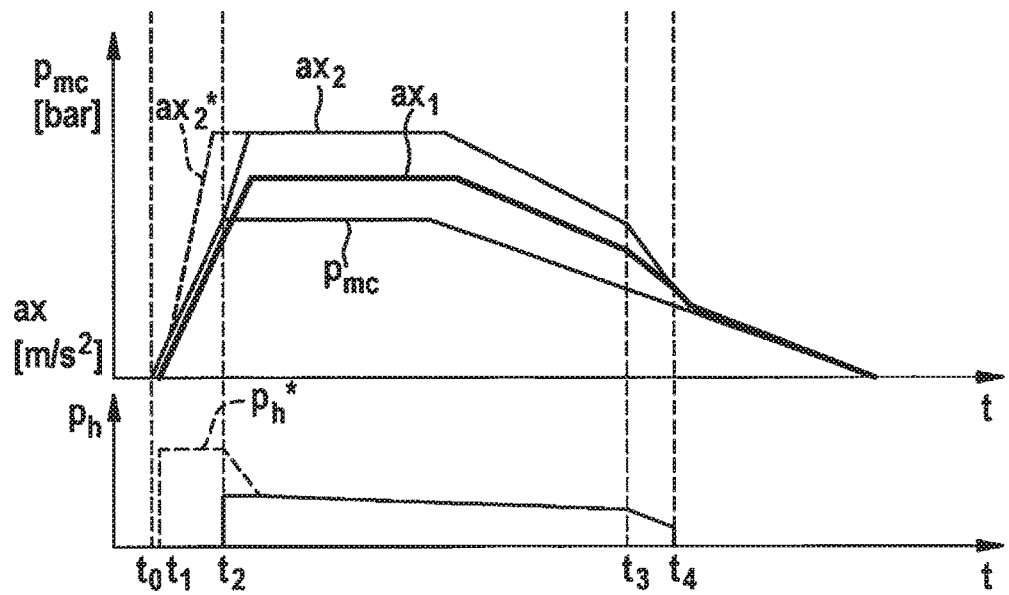
FIG. 1 shows an advantageous method for operating a braking device of a motor vehicle.

FIG. 1 shows a diagram on the basis of which an advantageous method for operating a braking device of a vehicle is to be explained. For this purpose, FIG. 1 shows, plotted in a diagram over time t, a vehicle deceleration $a_x$ while a braking operation is being carried out, pressure $p_{mc}$ in a brake master cylinder of the braking device and braking pressure $p_h$ additionally set by a hydraulic brake boost.

It is assumed that at instant $t_0$ a brake pedal of the braking device is being operated by the driver of the vehicle. As a result, pressure $p_{mc}$ in the brake master cylinder increases in accordance with the brake pedal actuation up to an instant $t_2$ at which the brake pedal has reached its end position as set by the driver. The presently considered braking device includes a pneumatic brake booster that automatically increases the braking pressure beyond the braking pressure specified by the driver. This produces a vehicle deceleration $ax_1$.

Additional pressure $p_h$ that is set by the hydraulic brake booster is displayed in the lower section of FIG. 1. The vehicle deceleration is normally used as the trigger criterion. For this purpose the current vehicle deceleration is compared, for example, to a limiting value and, when the limiting value is reached, the hydraulic brake booster additionally sets the additional braking pressure, as shown in FIG. 1, so that vehicle deceleration $ax_2$ (solid line) results. The additional brake boost by the hydraulic brake booster occurs only starting at instant $t_2$.

In the present case, a vacuum sensor is used to monitor a vacuum acting on the pneumatic brake booster. The vacuum here is provided, for example, by the intake port of an internal combustion engine of the motor vehicle or by a separate vacuum pump that acts correspondingly on the pneumatic brake booster.

Figure 2:
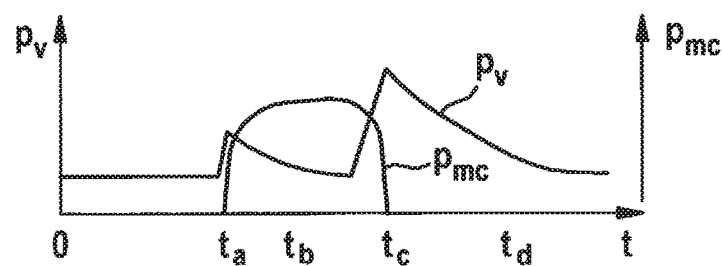
FIG. 2 shows a relationship between a brake booster prechamber pressure detected by a vacuum sensor and a brake master cylinder pressure.

FIG. 2 shows the relationship between vacuum $p_v$ of the pneumatic brake booster and pressure $p_{mc}$ of the brake master cylinder. To this end, the two pressures $p_v$ and $p_m$ are plotted over time t. At an instant $t_a$, if the brake pedal is being operated, pressure $p_v$ detected by the vacuum sensor increases. Pressure $p_{mc}$ in the brake master cylinder likewise increases. If the brake pedal is located in its end position, vacuum pressure $p_v$ detected by the vacuum sensor slowly decreases again within a time period $t_b$, while the pressure in the brake master cylinder stays the same. If the driver terminates the braking operation by, for example, removing his foot from the brake pedal at an instant $t_c$, the detected vacuum pressure increases to a maximum value, while the pressure in the brake master cylinder decreases again.

In the present case, it is now provided that the hydraulic brake boost is set or triggered based on pressure $p_v$ detected by the vacuum sensor. As is evident from FIG. 2, a change in the pressure detected by the vacuum sensor takes place nearly simultaneously with the brake pedal actuation. Accordingly, an especially early signal is available for triggering the hydraulic brake boost. Because the provision of vacuum sensors, especially for engine regulation, is already known in many motor vehicles, the provision of an additional sensor, it is possible in particular to eliminate the provision of a pressure sensor in the hydraulic circuit of the braking device. Pressure $p_v$ detected by the vacuum sensor is compared here to three different limiting values. When pressure value $p_v$ increases and exceeds the particular limiting value, a higher brake boost is set by the hydraulic brake booster.

The described approach now makes it possible to set the hydraulic brake boost much earlier than previously, namely already at instant $t_{21}$. Thus, FIG. 1 shows as a dashed line additional braking pressure $p_h^*$ provided by the hydraulic brake boost and vehicle deceleration $ax_2^*$ for the previously described case in which the hydraulic brake boost is set as a function of the pressure detected by the vacuum sensor. Thus, it is obvious that the brake boost is set or settable as a function of the pressure value not only earlier, namely at time $t_1$, but also with greater assistance, that is, with a higher additional braking pressure $p_h^*$. This results in earlier and sharper deceleration $ax_2^*$ of the motor vehicle.

The brake boost is preferably terminated in a ramp-like manner as shown in FIG. 1, the boost and the negative slope of the ramp preferably decreasing incrementally over time. The ramp-like reduction of the brake boost contributes in particular to driving comfort and is also a function of the residual vehicle speed. Preferably, a current road gradient and/or wear of the braking device are/is taken into account in the setting of brake boost $p_h^*$ and compensated by the setting of hydraulic brake boost $p_h^*$. As an alternative to the provision of three fixed specifiable limiting values for the setting of the hydraulic brake boost, it is also conceivable to set a continuous brake boost as a function of the current pressure value of vacuum sensor $p_v$.

What is claimed is:

1. A method for operating a hydraulic braking device of a vehicle that includes at least one brake booster which sets a hydraulic brake boost as a function of a braking command of a driver, comprising:
    ascertaining the braking command via a vacuum sensor assigned to a pneumatic brake booster;
    setting the hydraulic brake boost;
    detecting a pressure value by the vacuum sensor;
    comparing the detected pressure value to at least one first specifiable limiting value;
    setting a first brake boost when the first limiting value is exceeded;
    comparing the detected pressure value to a second specifiable limiting value;
    if the second limiting value is exceeded, setting a second hydraulic brake boost, wherein:
        the second limiting value is higher than the first limiting value, and
        the second brake boost is higher than the first brake boost;
    comparing the detected pressure value to a third specifiable limiting value; and
    if the third limiting value is exceeded, setting a third hydraulic brake boost, wherein:
        the third limiting value is higher than the second limiting value, and
        the third brake boost is higher than the second brake boost.

2. The method as recited in claim 1, wherein the vehicle is a motor vehicle.

3. The method as recited in claim 1, wherein the hydraulic brake boost is set as a function of at least one of a wear, a service life, and an operating temperature of the braking device.

4. The method as recited in claim 1, wherein the hydraulic brake boost is set as a function of a current road gradient.

5. A control unit operating a hydraulic braking device of a vehicle that includes at least one brake booster which sets a hydraulic brake boost as a function of a braking command of a driver, comprising:
   an arrangement which ascertains the braking command via a vacuum sensor assigned to a pneumatic brake booster;
   an arrangement which sets the hydraulic brake boost; and
   an arrangement which:
      detects a pressure value by the vacuum sensor,
      compares the detected pressure value to at least one first specifiable limiting value, a first brake boost being set when the first limiting value is exceeded;
      compares the detected pressure value to a second specifiable limiting value, a second hydraulic brake boost being set if the second limiting value is exceeded, the second limiting value being higher than the first limiting value, and the second brake boost being higher than the first brake boost; and
      compares the detected pressure value to a third specifiable limiting value, a third brake boost being set if the third limiting value is exceeded, the third limiting value being higher than the second limiting value, and the third brake boost being higher than the second brake boost.

6. The control unit as recited in claim 5, wherein the control unit is a brake system control unit.

\* \* \* \* \*